United States Patent [19]

Cohn et al.

[11] 4,363,129

[45] Dec. 7, 1982

[54] METHOD AND MEANS OF MINIMIZING SIMULCAST DISTORTION IN A RECEIVER WHEN USING A SAME-FREQUENCY REPEATER

[75] Inventors: Jona Cohn, Morton Grove; Allen L. Davidson, Crystal Lake; Anthony P. van den Heuvel, Arlington Heights, all of Ill.

[73] Assignee: Motorola, Inc., Schaumburg, Ill.

[21] Appl. No.: 215,589

[22] Filed: Dec. 11, 1980

[51] Int. Cl.³ .............................................. H04B 7/16
[52] U.S. Cl. ....................................... 455/17; 455/22; 455/61; 375/3
[58] Field of Search ................... 455/7, 10, 11, 17, 18, 455/61, 23, 22, 173, 276, 302, 303, 304, 307; 375/3, 4, 118; 332/1, 17, 22, 41; 370/26, 36, 97

[56] References Cited

U.S. PATENT DOCUMENTS

| | | | |
|---|---|---|---|
| 3,069,679 | 12/1962 | Sweeney et al. | 343/200 |
| 3,085,200 | 4/1963 | Goodall | 455/303 |
| 3,086,080 | 4/1963 | Raisbeck | 375/3 |
| 3,681,695 | 8/1972 | Cease et al. | 455/276 |
| 3,860,870 | 1/1975 | Furuya | 455/17 |
| 3,979,683 | 9/1976 | Ikeda | 455/303 |

*Primary Examiner*—Tommy P. Chin
*Attorney, Agent, or Firm*—Donald P. Reynolds; James W. Gillman

[57] ABSTRACT

Simulcast distortion in a receiver when using a same-frequency repeater is minimized by applying double modulation to a signal that is broadcast to the same-frequency repeater. A voice signal is applied without delay as AM on a carrier to a modulation index of up to 30%, and the same signal is also applied as FM on the same carrier with a time delay equal to the time delay in the same-frequency repeater. The same-frequency repeater detects the AM and applies the detected signal as FM on a carrier that is rebroadcast. Received FM signals are thus delayed by substantially the same amount whether they are received from the original broadcast or the same-frequency repeater.

7 Claims, 3 Drawing Figures

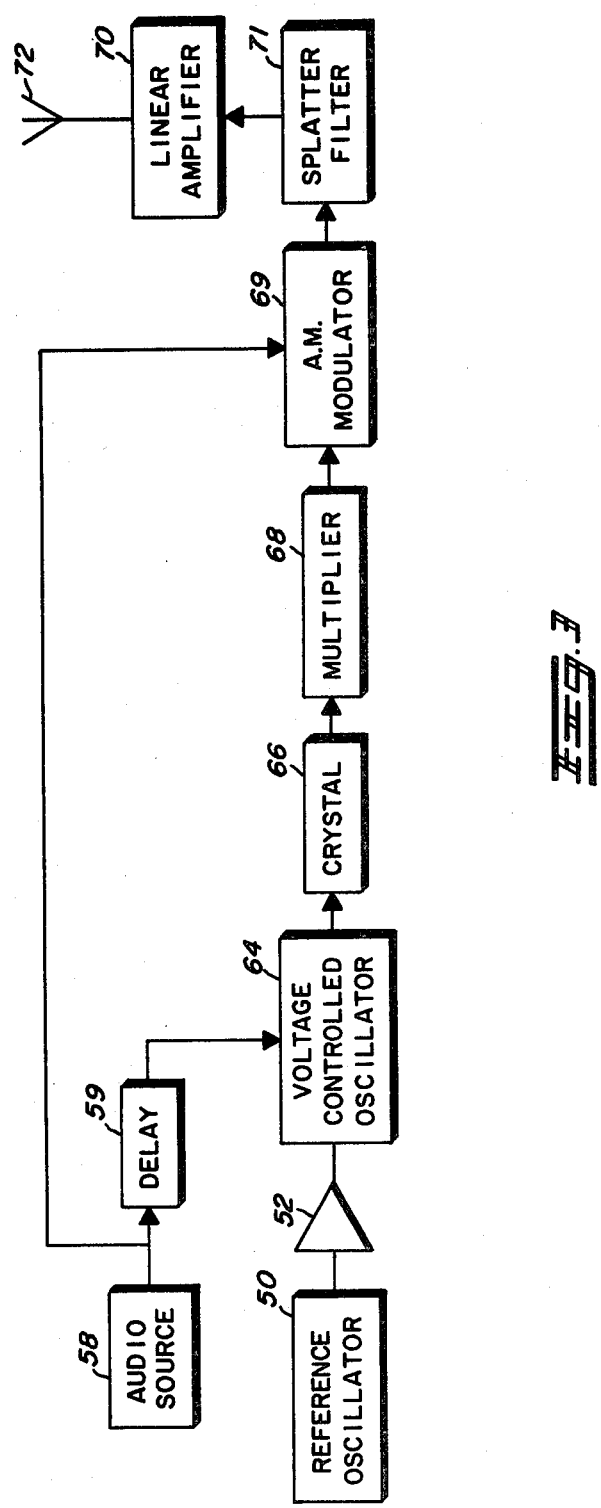

METHOD AND MEANS OF MINIMIZING SIMULCAST DISTORTION IN A RECEIVER WHEN USING A SAME-FREQUENCY REPEATER

BACKGROUND OF THE INVENTION

This invention relates to radio communication. In particular, this invention relates to the use of a same-frequency repeater.

Radio communication between one transceiver and another is frequently accomplished by having both transceivers transmit on a first frequency and receive on another. A special transceiver called a primary repeater receives the transmissions on the first frequency and rebroadcasts them on the second frequency. The cost in bandwidth for such a system is the bandwidth allotted to two transmitted signals. When it is desired to extend the area of coverage beyond that served by the primary repeater, either to fill shadows in coverage or to extend boundaries of coverage beyond the area readily reachable by the primary repeater, it is desirable to use one or more secondary repeaters. Typically, when broadcasting signals that are not directional, the secondary repeater transmits on a third frequency and receives on a fourth. The mobile units receive on the third frequency and transmit on the fourth. Since, in this arrangement, two systems are operating simultaneously on different frequencies, the cost in bandwidth for such a system is twice that for the single-channel system.

When it is desired to have a mobile unit receive transmissions directly from the primary repeater as well as from a secondary repeater, or when it is desired to have overlapping coverage from a plurality of repeaters, then a same-frequency repeater (SFR) is useful. An SFR is a transceiver that receives a transmission on a particular frequency and rebroadcasts that transmission at the same frequency after amplifying it to a high level. If a mobile unit is in a location where it receives a signal at one frequency, from either the primary repeater or a secondary repeater, it need not be tuned differently to receive both signals. Spectral usage is that of the mobile unit alone, and use of the radio has been made the simplest for the operator. However, in areas where the mobile unit can receive signals from two repeaters, the possibility exists of simulcast distortion. This is distortion resulting from reception of identical frequency-modulated signals delayed in time by a significant amount. Such delay begins to be detectable at about 10 microseconds. Over a few tens of microseconds the distortion is annoying but does not destroy intelligibility. As the delay approaches and exceeds 100 microseconds, however, it becomes increasingly difficult or impossible to understand the composite signal. With a primary repeater alone, simulcast distortion occurs principally when a reflected signal interferes with a direct signal that has been weakened by obstructions or the like. If the difference in signal strength is more than about 10 dB, the stronger signal will be captured and the weaker signal will not interfere. The inherent delay in a repeater is typically of the order of 100 to 200 microseconds. For this reason, whenever a receiver receives signals from two transmitters, one of which is a same-frequency repeater, and those signals are within about 10 dB in relative signal strength, reducing the probability of capture, the detected signal will be greatly distorted.

There is an additional problem that can interfere with communication when using repeaters. If a repeater is not synchronized in frequency with another transmitter operating at nearly the same frequency, the possibility exists of beats between the different carriers. If such beats occur above about 50 Hz, they become audible and annoying. To minimize beats with present repeaters providing overlapping coverage, it is common to use transmitters with carrier frequencies related to very high-stability oscillators such as the output of rubidium-standard oscillators. Such oscillators can achieve frequency control that eliminates audible beats, but at considerable cost.

It is an object of the present invention to minimize beats between signals when using same-frequency repeaters.

It is further object of the present invention to eliminate simulcast distortion between signals from SFR's at a relatively low cost.

It is a further object of the present invention to prevent distortion resulting from the reception of two radio signals identical in content and delayed in time when using a same-frequency repeater.

Other objects will become apparent in the course of a detailed description of the invention.

SUMMARY OF THE INVENTION

In a radio system using a same-frequency repeater, simulcast distortion in a receiver is minimized by applying double modulation to a radio signal broadcast from a primary repeater or other station that originates transmissions. The modulating signal is applied to the carrier as amplitude modulation with a modulation index that is of the order of twenty or thirty percent. The modulating signal is also delayed by an amount equal to the time delay of a repeater and is applied as frequency modulation to the same carrier or to another carrier at substantially the same frequency. A single-frequency repeater that receives a signal from the primary repeater is caused to ignore the received frequency modulation, to detect the received amplitude modulation, and to apply the detected modulation as FM on a repeated signal. The remote receiver is caused to respond only to FM. Because the delay applied to the FM signal at the base station equals the delay produced in passing through the repeater, the modulated signal detected by the remote receiver will have much less simulcast distortion.

BRIEF DESCRIPTION OF THE DRAWINGS

FIG. 3 is a block diagram of a typical base station for the practice of the present invention.

DESCRIPTION OF THE PREFERRED EMBODIMENT

Figure 1:
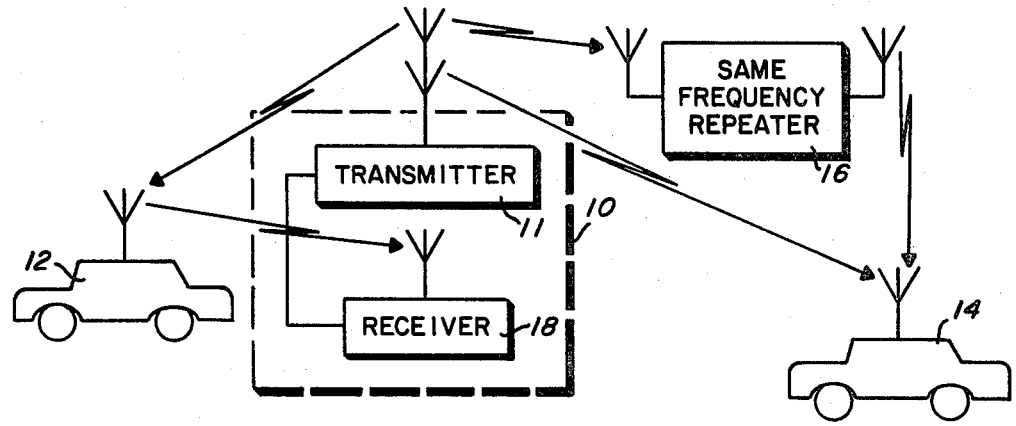
FIG. 1 is a symbolic block diagram of an apparatus for the practice of the invention.

FIG. 1 is a symbolic block diagram of an apparatus for the practice of the present invention. In FIG. 1 a primary repeater 10 is shown as communicating with two mobile units 12 and 14. Mobile unit 12 is receiving directly from primary repeater 10, but mobile unit 14 receives signals from two sources. The first of these sources is primary repeater 10, and the second is same-frequency repeater (SFR) 16. Without the present invention, the unavoidable time delay in SFR 16 will cause its signal to combine in mobile unit 14 with the undelayed signal from the primary repeater 10 to produce simulcast distortion at mobile unit 14. An obvious way around this simulcast distortion is to use frequency selectivity by tuning a repeater to a different frequency from the broadcast frequency of the primary repeater 10. However, if SFR 16 were caused to be rebroadcast on a different frequency from the broadcast frequency of primary repeater 10, then an operator at mobile unit 14 would have to tune to receive one signal or the other. Such retuning is rendered unnecessary by the present invention, so that the only carrier frequency in use in a system such as that of FIG. 1 is the frequency of transmission from primary repeaters 10 and SFR 16 to the mobile units 12 and 14.

To practice this invention it is necessary first to know the time delay required for signals to pass through the same-frequency repeater in this system. That time delay is taken as a constant and is used in the operation of primary repeater 10 to apply two types of modulation to the signal that is transmitted from primary repeater 10. The audio signal to be broadcast is applied as frequency modulation to a signal that is then delayed by an amount equal to the time delay in a same-frequency repeater. The delay may be produced at broadcast frequency or lower. In the alternative, the audio signal itself may be delayed. The same audio signal is used without a time delay to apply amplitude modulation with an index of about 20% to the signal broadcast from primary repeater 10. The system is operable with modulation indices as high as 70%, but interference begins to become noticeable between 20% and 30%. It is undetectable at modulation indices at and below 20%. The modulation indices are defined here as the ratio of the maximum amplitude of an amplitude modulating signal to the amplitude of the unmodulated carrier.

When the broadcast signal is received at SFR 16, only the amplitude modulation is detected for use as a modulating signal. This modulating signal is applied as FM to the signal to be rebroadcast from the SFR. Mobile units 12 and 14 are then caused to respond only to frequency modulation. This is easily done by applying their signals to limiters. The FM signals received by mobile station 12 and 14 are then separated in time only by whatever differences in path length may exist between them and the transmitters that produce the signals they receive. The effect of the time delay in SFR 16 has been substantially cancelled by introducing the same time delay to the FM signal before it is broadcast from primary repeater 10.

Figure 2:
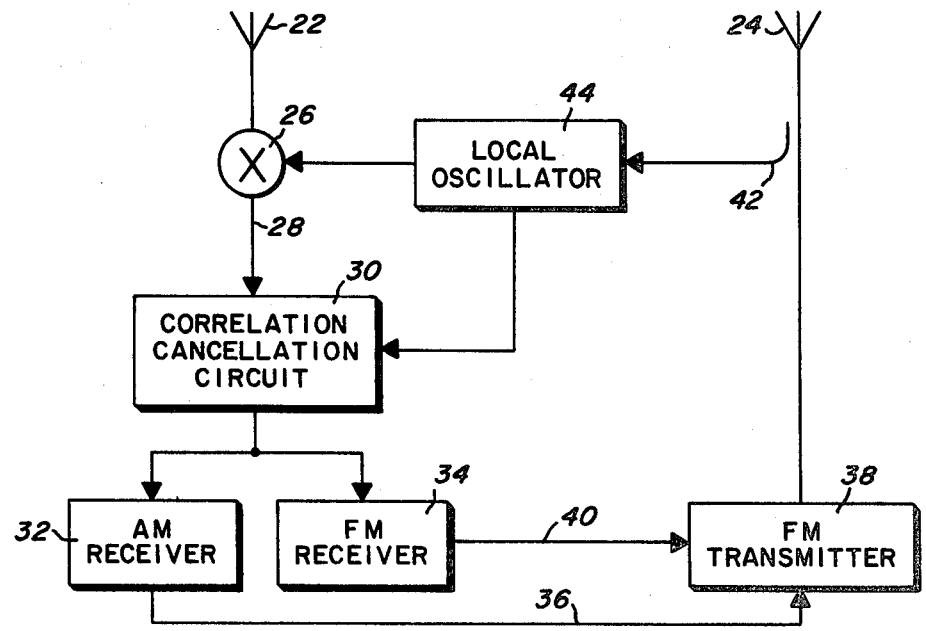
FIG. 2 is a block diagram of the same-frequency repeater of FIG. 1.

FIG. 2 is a block diagram of the circuit of the SFR 16 of FIG. 1. In FIG. 2, a receiving antenna 22 receives a signal that is to be repeated and broadcast on transmitting antenna 24. The received signal from receiving antenna 22, containing both FM and AM, is mixed in mixer 26 with a signal chosen to have a frequency that will produce a desired IF frequency on line 28. The IF signal is applied to a correlation-cancellation circuit 30 to minimize the effects of spillover of signal from transmitting antenna 24 into receiving antenna 22. The IF signal from the correlation-cancellation circuit 30 is taken to an AM receiver 32 and an FM receiver 34. The detected AM signal from AM receiver 32 is connected on line 36 to FM transmitter 38 which is modulated with the detected signal. FM transmitter 38 derives its carrier frequency from the IF signal so that the carrier is synchronized with the signal received from the primary repeater. The output of FM receiver 34 is connected through line 40 to FM transmitter 38 to control the deviation of the FM signal produced by transmitter 38. An output signal from FM transmitter 38 is connected to transmitting antenna 24 to be broadcast and is also sampled in directional coupler 42 to be applied to synchronize local oscillator 44 as part of the correlation-cancellation process.

FIG. 3 is a functional block diagram of a typical transmitter for the practice of the present invention. In FIG. 3 a reference oscillator 50 generates a signal that will be multiplied to achieve the desired broadcast frequency. Reference oscillator 50 is the frequency standard for the system that is described. It must be sufficiently stable to meet broadcast standards but is not as stable as would be required to be in sufficiently close synchronism with multiple independently synchronized transmitters. However, it is the only such precision oscillator in the system, and it is located at the primary repeater in contrast to systems which require precision oscillators at repeaters which may be at remote locations. It can be expected that the primary repeater will be at a site that is simpler to service than an SFR.

A signal from reference oscillator 50 is amplified in buffer amplifier 52 and then coupled to voltage-controlled oscillator (VCO) 64. This is a device that incorporates a synthesizer or similar device that is synchronized with the output signal from buffer amplifier 52 and that produces narrow-band frequency modulation in response to an informational signal from audio source 58, as delayed by delay unit 59. The output of VCO 64 is a frequency modulated signal that exhibits variations about the frequency of reference oscillator 50 and that is synchronized with the signal from reference oscillator 50. The signal from VCO 64 is delayed in crystal filter 66, and the delayed signal is raised to the broadcast frequency in multiplier chain 68. Undelayed audio from audio source 58 is connected to amplitude modulator 69, which applies AM to the signal. A splatter filter 71 may be needed to keep the doubly modulated signal within an allowable band. After amplification in linear amplifier 70, the signal is broadcast from antenna 72. As broadcast, the signal contains undelayed amplitude modulation and delayed frequency modulation, with the amount of delay chosen to be that of an SFR in the system.

The circuit of FIG. 3 applies delay to the audio signal. Crystal filter 66 will produce RF delay that will add to the delay of delay unit 59 to produce a total delay. It should be noted that delay unit 59 would be unnecessary if enough delay could be produced in crystal filter 66. Splatter filter 71 may also be unnecessary. These are design choices that do not affect the practice of the invention.

We claim:

1. A method of minimizing simulcast distortion when broadcasting an information signal directly to an FM receiver and indirectly to the FM receiver through a same-frequency repeater comprising the steps of:
   generating an RF signal that is amplitude-modulated with the information signal and that is frequency-modulated with the information signal delayed by a predetermined length of time;
   broadcasting the RF signal to the FM receiver and to the same-frequency repeater;
   detecting the amplitude-modulated signal at the same-frequency repeater and applying the detected signal as frequency modulation to a repeater to produce a repeated RF signal that is inherently delayed in the repeater by the predetermined length of time; and broadcasting the repeated RF signal to the FM receiver;

whereby the RF signal and the repeated RF signal will both be delayed at the FM receiver, by essentially the predetermined length of time, thereby minimizing simulcast distortion.

2. The method of claim 1 wherein the step of generating an RF signal comprises the steps of:

generating a signal at a fixed frequency from a reference oscillator;

applying the signal to a voltage-controlled oscillator;

controlling the voltage-controlled oscillator by the delayed information signal to produce a frequency-modulated signal;

filtering the frequency-modulated signal to produce a delayed frequency-modulated signal;

multiplying the delayed frequency-modulated signal to a desired broadcast frequency;

applying amplitude modulation by the information signal to the multiplied signal to produce a combined signal containing undelayed amplitude modulation and delayed frequency modulation;

amplifying the combined signal to a desired broadcast power level; and transmitting the amplified combined signal.

3. The method of claim 1 wherein the step of generating an RF signal comprises the steps of:

(a) generating a signal at a fixed frequency from a reference oscillator;

(b) applying the signal to a voltage-controlled oscillator;

(c) delaying the information signal;

(d) controlling the voltage-controlled oscillator by the delayed information signal to produce a delayed frequency-modulated signal whose information content has been delayed;

multiplying the delayed frequency-modulated signal to a desired broadcast frequency;

applying amplitude modulation by the information signal to the multiplied signal to produce a combined signal containing undelayed amplitude modulation and delayed frequency modulation;

amplifying the combined signal to a desired broadcast power level; and transmitting the amplified combined signal.

4. The method of claims 2 or 3 wherein the step of applying amplitude modulation comprises in addition the step of limiting the amplitude modulation to a modulation index equal to or less than 30 percent.

5. The method of claim 1 wherein the step of detecting the amplitude-modulated signal at the same frequency repeater and applying the detected signal as frequency-modulation comprises the steps of:

mixing the detected signal with a signal from a synchronized local oscillator to produce an intermediate-frequency (IF) signal consisting of one signal which has AM delayed FM, and a second signal which is a result of the spillover from the SFR transmitter;

applying the IF signal to a correlation-cancellation circuit to minimize the effect of spillover and thereby produce an IF signal containing AM and delayed FM;

applying the delayed FM to an FM receiver to produce a synchronizing signal;

applying the AM to an AM receiver to recover the information signal;

applying the recovered information signal as FM to an FM transmitter to produce the repeated RF signal;

applying the synchronizing signal to control frequency of the FM transmitter; and sampling the repeated RF signal to control the correlation-cancellation circuit.

6. An apparatus for minimizing simulcast distortion when broadcasting an information signal to a receiver, the apparatus comprising:

means for modulating a broadcast carrier simultaneously with the information signal as AM and with a delayed information signal as FM;

means for receiving the broadcast carrier; means for detecting the AM to produce a detected signal; and means for modulating with the detected signal as FM on a repeater carrier that is synchronized to the broadcast carrier; and means for broadcasting the repeater carrier.

7. The apparatus of claim 6 wherein the delayed informational signal is delayed by an amount of time substantially equal to the time that is required to receive the broadcast carrier and generate the repeater carrier.

* * * * *